United States Patent
Miglani et al.

(10) Patent No.: US 9,438,968 B2
(45) Date of Patent: Sep. 6, 2016

(54) MAKING MASS CONNECTIONS IN AN OPTICAL CIRCUIT SWITCH

(71) Applicant: CALIENT Technologies, Inc., Goleta, CA (US)

(72) Inventors: Jitender Miglani, Hollis, NH (US); Mike Deacon, Ventura, CA (US); Vijayan Thattai, Goleta, CA (US)

(73) Assignee: CALIENT Technologies, Inc., Goleta, CA (US)

( * ) Notice: Subject to any disclaimer, the term of this patent is extended or adjusted under 35 U.S.C. 154(b) by 452 days.

(21) Appl. No.: 13/938,008

(22) Filed: Jul. 9, 2013

(65) Prior Publication Data

US 2015/0016820 A1  Jan. 15, 2015

(51) Int. Cl.
*H04J 14/00* (2006.01)
*H04Q 11/00* (2006.01)

(52) U.S. Cl.
CPC ..... *H04Q 11/0005* (2013.01); *H04Q 2011/003* (2013.01); *H04Q 2011/0039* (2013.01)

(58) Field of Classification Search
CPC .... G02B 1/00; G02B 6/3588; G02B 6/3518; G02B 26/08; G02B 6/3512; H04Q 2011/0043
USPC .............................. 398/50, 56, 57
See application file for complete search history.

(56) References Cited

U.S. PATENT DOCUMENTS

| | | | |
|---|---|---|---|
| 5,037,173 A | 8/1991 | Sampsell et al. | |
| 6,097,860 A | 8/2000 | Laor | |
| 6,411,751 B1 * | 6/2002 | Giles ................... | G02B 6/3588 324/97 |
| 6,456,751 B1 | 9/2002 | Bowers et al. | |
| 6,556,739 B1 | 4/2003 | Kruglick et al. | |
| 6,567,574 B1 | 5/2003 | Ma et al. | |
| 6,571,029 B1 | 5/2003 | Kruglick et al. | |
| 6,628,041 B2 | 9/2003 | Lee et al. | |
| 6,690,885 B1 | 2/2004 | Aksyuk et al. | |
| 6,798,992 B1 | 9/2004 | Bishop et al. | |
| 6,819,815 B1 | 11/2004 | Corbalis et al. | |
| 6,823,101 B2 | 11/2004 | Gates, II et al. | |
| 6,836,381 B2 | 12/2004 | Giles et al. | |
| 7,277,606 B1 * | 10/2007 | Sakai ..................... | G02B 6/359 385/17 |
| 7,676,125 B2 | 3/2010 | Zheng et al. | |
| 2003/0223676 A1 * | 12/2003 | Bernstein ............... | G02B 6/358 385/18 |
| 2004/0047548 A1 * | 3/2004 | Okumura ............... | G02B 6/359 385/18 |
| 2005/0286891 A1 | 12/2005 | Sakai et al. | |

(Continued)

*Primary Examiner* — David Payne
*Assistant Examiner* — Pranesh Barua
(74) *Attorney, Agent, or Firm* — SoCal IP Law Group LLP; John E. Gunther; Steven C. Sereboff (57) ABSTRACT

An optical circuit switch, method, and apparatus are disclosed. The optical circuit switch may include a plurality of mirror elements, each mirror element uniquely associated with a port from a plurality of ports, each mirror element coupled to a dedicated electrode and configured to rotate in response to a voltage applied to the dedicated electrode. A command interpreter may receive a command defining a plurality of port-pairs to be connected via the optical circuit switch and determine a respective target voltage value to be applied to the dedicated electrode coupled to each of the mirror elements associated with each of the port-pairs. A transition manager may cause voltages applied to the dedicated electrodes coupled to the mirror elements associated with the port-pairs to concurrently transition from respective previous voltage values to the respective target voltage values.

23 Claims, 7 Drawing Sheets

(56) References Cited

U.S. PATENT DOCUMENTS

2008/0050065 A1* 2/2008 Sakai .................... G02B 6/356
                                                              385/18
2008/0298696 A1* 12/2008 Kakarala ............ H04N 5/23245
                                                             382/238
2010/0020378 A1* 1/2010 Yamaguchi ........ G02B 26/0841
                                                            359/221.2

* cited by examiner

MAKING MASS CONNECTIONS IN AN OPTICAL CIRCUIT SWITCH

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
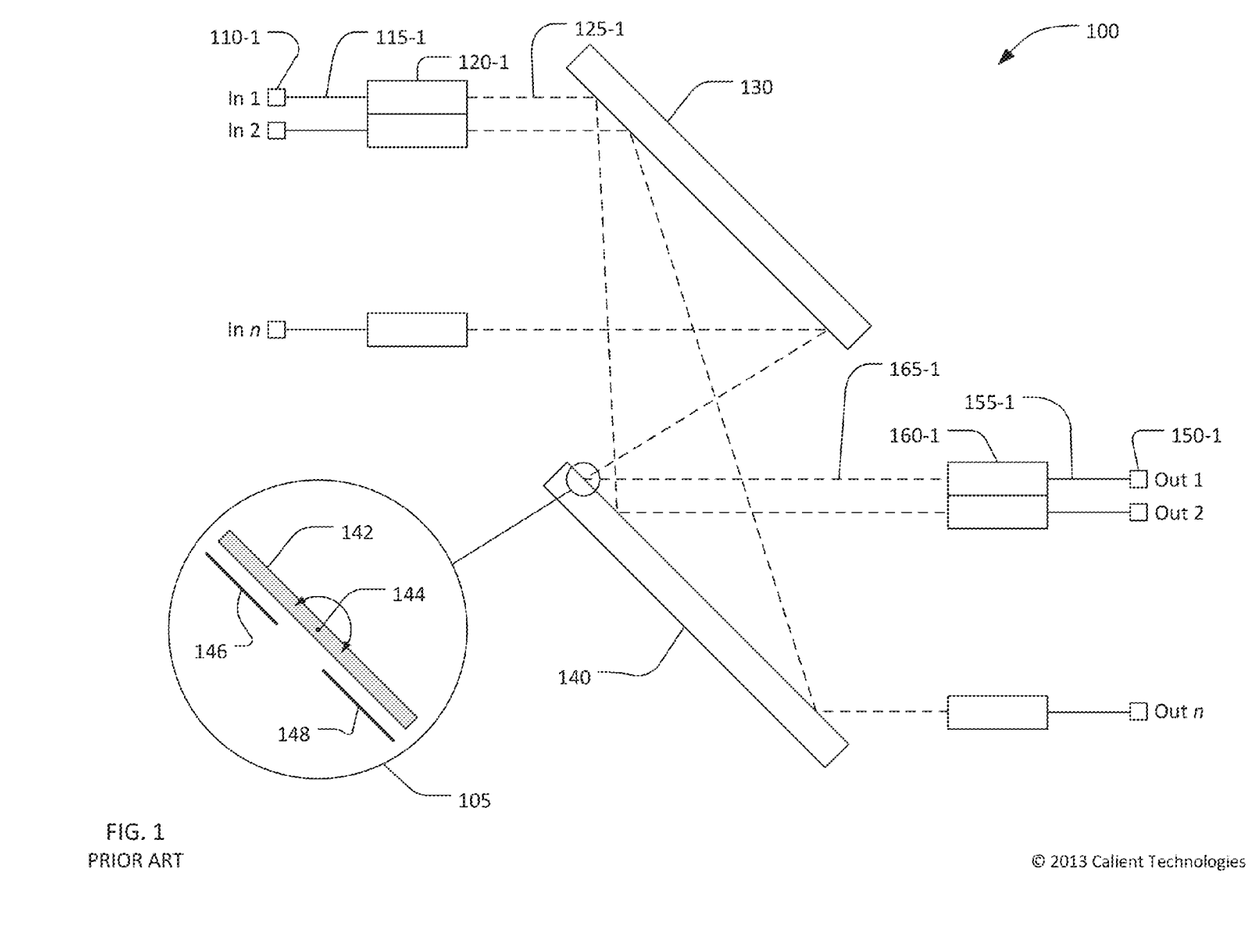
FIG. 1 is an optical schematic diagram of an optical circuit switch.

Referring now to FIG. 1, an optical circuit switch 100 may be configured to connect a first group of n ports (where n is an integer greater than 1), labeled In 1 to In n, to a second group of n ports, labeled Out 1 to Out n. More specifically, the optical circuit switch 100 may selectively connect up to n pairs of ports, where each pair of ports includes a port from the first group and a port from the second group. For ease of description, and in practical use, the first group of ports may be considered as input ports and the second group of ports may be considered as output ports. However, the optical circuit switch 100 may be capable of transferring optical signals in either direction between the first group of ports and the second group of ports.

Each of the input ports (In 1 to In n) may be a connector (of which only the connector 110-1 is identified) to receive an optical fiber cable (not shown). Each connector may be coupled by a respective optical fiber (of which only optical fiber 115-1 is identified) to a respective collimator lens (of which only collimator lens 120-1 is identified). Each collimator lens may convert an optical signal from the respective optical fiber into a collimated input optical beam (of which only input optical beam 125-1 is identified) in free space. Free space optical beams are shown in FIG. 1 as dashed lines.

Each free space input optical beam, such as optical beam 125-1 may be directed onto a first mirror array 130. The first mirror array may include n mirror elements with a one-to-one correspondence between input optical beams and mirror elements, such that each input optical beam is directed onto a respective mirror element. To improve the manufacturing yield of the first mirror array, the first mirror array 130 may include more than n mirror elements, in which case the n input optical beams may be directed to a subset of n mirror elements that are known to be fully functional. Since each of the n input optical beams originates from a specific port and is directed onto a specific mirror element, each port may be described as "uniquely associated" with a corresponding mirror element. In the context, "uniquely associated" means a one-to-one correspondence.

Each mirror element on the first mirror array 130 may direct the respective optical beam to a selected mirror element of a second mirror array 140. The mirror elements of the second mirror array 140 may reflect the respective incident optical beams as respective output optical beams (of which only output optical beam 165-1 is identified). The second mirror array 140 may direct the respective optical beam to corresponding collimator lenses (of which only collimator lens 160-1 is identified). Each collimator lens may focus the respective output optical beam into a respective optical fiber (of which only optical fiber 155-1 is identified) that conveys the optical signal to a respective output port connector (of which only connector 150-1 is identified).

The optical circuit switch 100 may create a one-to-one connection between each input port and any one of the output port. For example, as shown in FIG. 1, Port In 1 is connected to port Out 2, port In 2 is connected to port Out n, and port In n is connected to port Out 1.

The detail view 105 shows a simplified schematic diagram of a mirror element from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148. For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode may be "dedicated" to the mirror element 142, which is to say the only function of the electrodes 146 and 148 is to rotate the mirror element 142 and the voltages applied to the electrodes 146 and 148 have no effect on any mirror element other then the mirror element 142.

In the simplified example of FIG. 1, the mirror element 142 rotates about a single axis defined by the torsion bars 144. Either or both of the first mirror array 130 and the second mirror array may include mirror elements configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 105. For example, U.S. Pat. No. 6,628,041 describes a MEMS mirror array having two-axis mirror element motion and comb actuators.

Figure 2:
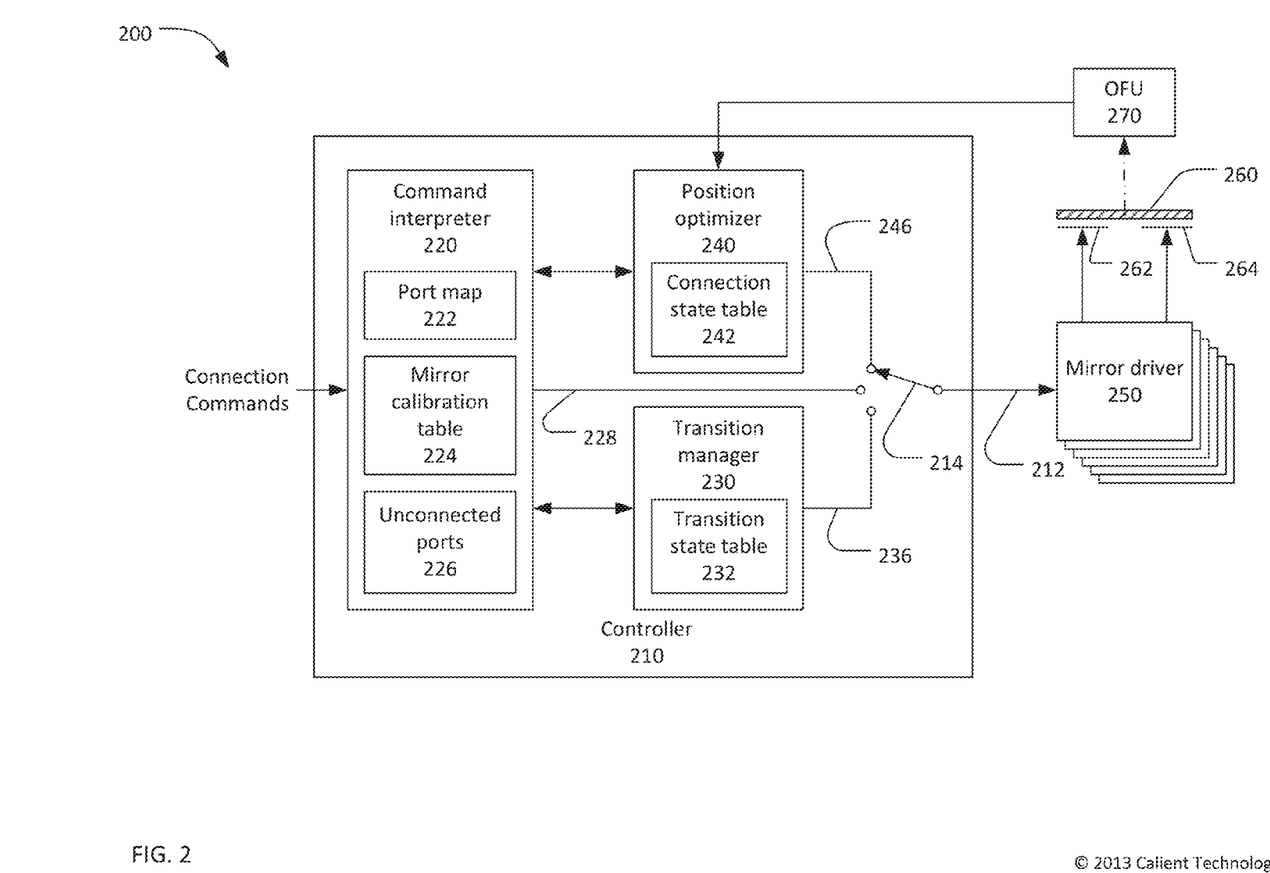
FIG. 2 is a block diagram of portions of an optical circuit switch.

FIG. 2 is a simplified block diagram of the control and mirror driver portions of an optical circuit switch 200, which may be the optical circuit switch 100. The optical circuit switch 200 may include a controller 210, an optical feedback unit (OFU) 270, and a plurality of mirror driver circuits 250. The optical circuit switch 200 may include one mirror driver circuit 250 for each mirror element in two mirror arrays if the individual mirror elements are rotatable about a single axis. The optical circuit switch 200 may include two mirror driver circuits 250 for each mirror element in the mirror arrays if the individual mirror elements are rotatable about two orthogonal axes. Each mirror driver circuit 250 may have two selectable outputs to drive one or the other of a pair of electrodes 262, 264 coupled to each mirror element 260.

The controller 210 may include a command interpreter 220, a transition manager 230, and a position optimizer 240. The command interpreter 220 may receive connection commands from an external source. For example, the command interpreter 220 may receive connection commands from a user, such as an operator of a communications system or data center, via a graphical user interface. The command interpreter 220 may receive connection commands from an automated system administrator via a network or other communications path. The command interpreter 220 may receive connection commands from some other source or in some other manner.

The command interpreter 220 may be responsive to a set of connection commands. The set of connection commands may include, for example "Break a-b" and "Make a-b". These commands may respectively instruct the optical circuit switch 200 to either break an existing connection between ports a and b (where a is an integer input port number and b is an integer output port number), or to make a new connection between ports a and b. The set of connection commands may include a mass connection command, which may list multiple connections to be made. The mass connection command may be used, for example, when the optical circuit switch is initially integrated into a network or data center or when substantial reconfiguration of the network or data center is required. It may be desirable to make all of the connections defined in a mass connection command within a short time interval.

The command interpreter 220 may include or have access to a port map 222. As previously described, to allow the use of mirror arrays with a small number of nonoperational mirror elements, the number of mirror elements in each mirror array may be larger than the number of input or output ports. Each input and output port may be coupled to a known operation mirror element in the respective array. The port map 222 may be a table containing data relating each input port to a mirror element in a first mirror array, and data relating each output port to a mirror element in a second mirror array. The data in the port map 222 may be specific to the particular first and second mirror arrays used in the optical circuit switch 200.

There may be some performance variation from mirror element to mirror element and/or from mirror array to mirror array. In particular, there may be some variation in the mirror element rotation angle versus voltage characteristics within and between mirror arrays. The command interpreter 220 may include or have access to a mirror calibration table 224 which contains data describing the performance of each mirror element. For example, the mirror calibration table 224 may store the rotation angle versus voltage characteristic of each mirror element. The mirror calibration table 224 may store, for all possible pairs of mirror element numbers, a set of voltages that, when applied to the appropriate electrodes, will cause the mirror elements to rotate to make the desired connection. The data in the mirror calibration table may be specific to the particular mirrors arrays used in the optical circuit switch 200. The data in the mirror calibration table may be derived, for example, from the results of tests performed on the particular mirror arrays used in the optical circuit switch 200.

The mirror arrays used the optical circuit switch 200 may be fabricated by chemical micromachining of a silicon substrate. For example, each mirror element 260 may consist of a reflective coating on a silicon slab that is connected to the silicon substrate by narrow silicon elements that function as torsion bars. Each silicon mirror slab may be free to rotate about the axis or axes defined by the torsion bars. The torsion bars and the mirror slab may form an under-damped spring-mass mechanical system. An abrupt change in the voltage applied to an electrode coupled to a mirror element may cause the mirror element to overshoot the desired rotation angle and then oscillate about the desired rotation angle. Mirror element oscillation may continue for a period of time that is long compared with a desired switching time for an optical circuit. Mirror element overshoot and oscillation may fatigue or damage the mirror slab and/or torsion bars.

The transition manager 230 may minimize mirror element overshoot and oscillation by controlling the rate of change of the voltage applied to each mirror electrode. For example, to change the voltage applied to an electrode from an initial value to a target value, the transition manager 230 may change the voltage applied to the electrode in incremental steps at periodic time intervals. The transition manager 230 may change the voltage applied to the electrode in steps of predetermined amplitude, using as many steps as needed to transition from the initial value to the target value. The transition manager 230 may cause the voltage applied to the electrode to transition from the initial value to the target value in a predetermined number of steps, incrementing the voltage by an appropriate amount (i.e. the difference between the target value and the initial value divided by the number of steps) at each step.

The transition manager 230 may cause a nonlinear transition between an initial voltage value and a target voltage value. For example, the transition manager may cause the voltage applied to an electrode to change by a larger increment initially to overcome inertia of the mirror element and then change the voltage by a smaller increment as the mirror element approaches its target position. The transition manager may cause the voltage applied to an electrode to change in accordance with a formula or function intended to minimize or eliminate overshoot and oscillation.

The transition manager 230 may include or have access to a transition state table 232. The transition state table 232 may identify each port and the associated mirror element that are in the process of being connected to another port, or in the process of being returned to a default state after disconnection from another port. The transition state table 232 may effectively identify each mirror element being controlled by the transition manager 230. The transition state table may include additional information, to be discussed subsequently, associated with each mirror element controlled by the transition manager 230.

The position optimizer 240 may receive feedback from the OFU 270 and may use the feedback to optimize the position of some or all of the mirror elements to minimize the insertion loss of each optical circuit. The OFU 270 may, for example, provide feedback to the position optimizer 240 by indirectly measuring the position of each mirror element by measuring the positions of probe beams reflected from the mirror elements, as described in U.S. Pat. No. 6,819,815. The OFU 270 may provide feedback to the position optimizer 240 by measuring the insertion loss of each optical circuit made by the optical circuit switch 200. For example, as described in U.S. Pat. No. 7,676,125, the OFU 270 may use a small number of optical power meters and a scanning optical system to periodically measure the insertion loss for each optical circuit. In this case, the OFU 270 may not continuously measure the insertion loss of each optical circuit, but instead may provide regular samples of the insertion loss of each circuit. The OFU 270 may provide feedback to the position optimizer 240 in some other manner.

The position optimizer 240 may include or have access to a connection state table 242. The connection state table 242 may identify each port and the associated mirror element that is involved in a connection. The connection state table 242 may effectively identify each mirror element being controlled by the position optimizer 240. The connection state table 242 may include additional information, such as the present voltage being applied to each mirror element controlled by the position optimizer 240.

The command interpreter 220 may include, or have access to, a table of unconnected ports 226. The table of unconnected ports 226 may list all ports, and the associated mirror elements, that are currently not connected to another port or currently being connected to another port. The table of unconnected ports may list all ports that are not included in the transition state table 232 and the connection state table 242.

The controller 210 may output a respective voltage value to each of the plurality of mirror driver circuits 250. For example, the controller 210 may be connected to the plurality of mirror driver circuits 250 by a digital data bus 212. Each voltage value may be output from the controller 210 as a digital value that is stored and converted to an analog voltage within the respective mirror driver circuit 250.

As indicated schematically by the switch 214, the source of the digital voltages values output from the controller 210 may depend on the state of the mirror elements. Mirror elements that are used in established connections (i.e. mirror elements identified in the connection state table 242) may receive digital voltage values 246 generated by the position optimizer 240. Mirror elements that are in the process of being connected (i.e. mirror elements identified in the transition state table 232) may receive digital voltage values 236 generated by the transition manager 230. Unused mirror elements (i.e. mirror elements identified in the table of unconnected ports 226) may receive default digital voltage values 228. The default voltage values 228 may be the same or different for the plurality of mirror elements. For example, the appropriate default voltage value for each mirror element or may be included in the mirror calibration table 224.

Figure 3:
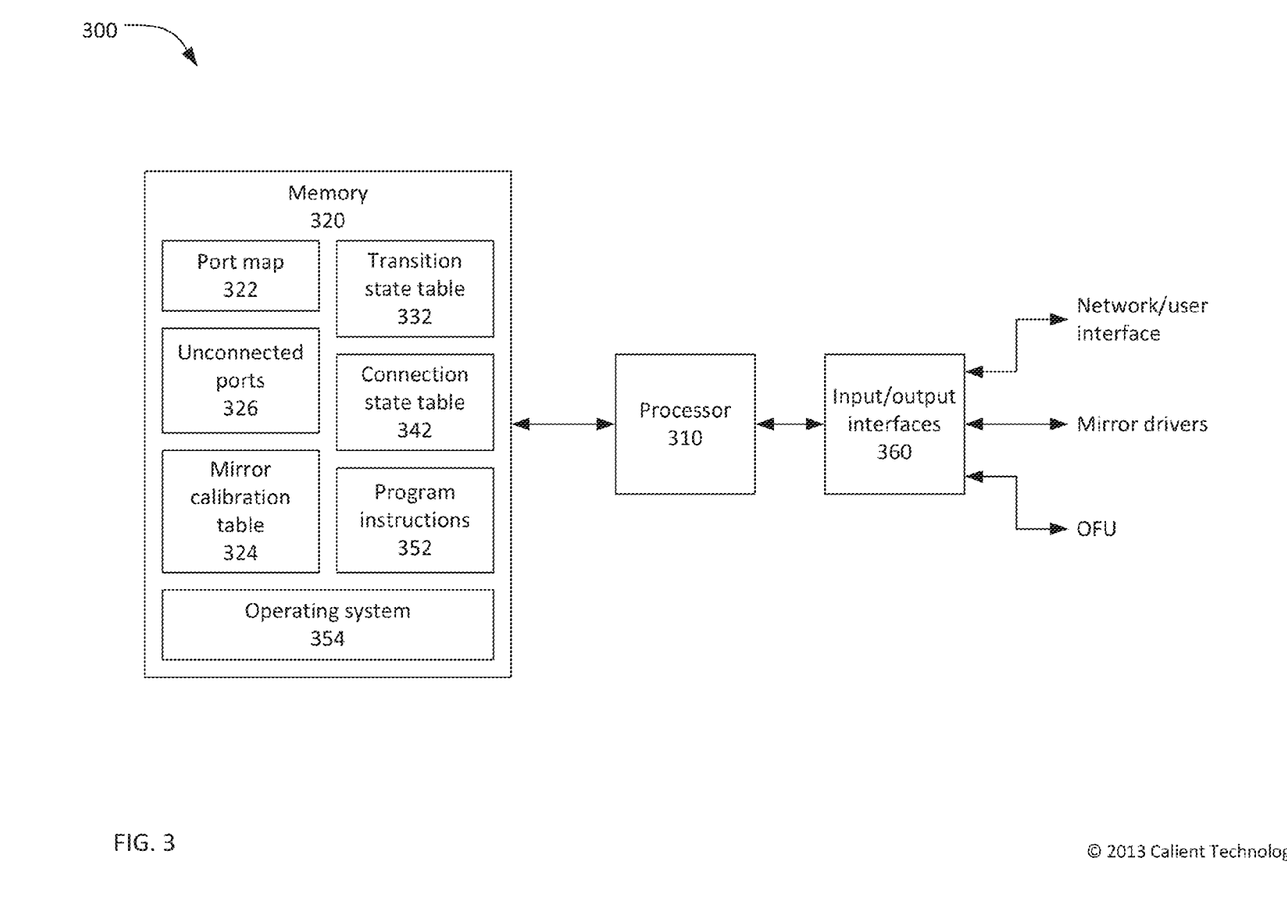
FIG. 3 is a block diagram of a computing device.

Referring now to FIG. 3, a controller 300, which may be suitable for use as the controller 210 in the optical circuit switch 200, may include a processor 310 coupled to a memory 320 and input/output interfaces 360. The controller 300 may implement the functions of the command interpreter 220, the position optimizer 240, and the transition manager 230.

The processor 310 may include one or more processing devices, such as microprocessors and programmable signal processors, that execute software instructions stored in the memory 320. The processor 310 may include one or more non-programmable processing devices that execute hardware-defined functions. The processor 310 may include other specialized circuits and devices as required to implement the methods and functions described herein. When the processor 310 includes multiple processing devices, the processing devices may be separately coupled to the memory 320 and the input/output interfaces 360.

The memory 320 may include both nonvolatile memory and volatile memory. The nonvolatile memory may be or include semiconductor read-only memory, semiconductor nonvolatile memory such as flash memory, magnetic storage devices such as magnetic disc drives, and optical storage devices such as CD-ROM or CD-R/W drives. The volatile memory may be static or dynamic semiconductor random access memory (RAM).

The memory 320 may store software instructions for execution by the processor 310. The software instructions may include program instructions 352 and an operating system 354. The program instructions 352 may include instructions to cause the processor 310 to implement all or part of the functions of the command interpreter 220, the position optimizer 240, and the transition manager 230. The operating system 354 may be, for example, an embedded or real-time operating system such as a version of Linux®, or Microsoft Windows CE®, or some other operating system.

The memory 320 may store tables, lists, and other data for use by the processor 310. The data stored in the memory 320 may include a port map 322 that identifies which mirror element on one of two mirror arrays is associated with each port of the optical circuit switch. The data stored in the memory 320 may include an unconnected ports table 324 identifying ports that are not presented connected to other ports. The data stored in the memory 320 may include a mirror calibration table 326 which contains data describing the performance of each movable mirror element in the optical circuit switch. The data stored in the memory 320 may include a transition state table 332 listing each mirror element currently in transition between two positions and associated information. The data stored in the memory 320 may include a connection state table 342 listing each mirror element currently used in a connection between two ports and associated information.

The input/output interfaces 360 may include circuits, devices, and/or firmware to transfer data between the processor 310 and an optical feedback unit (OFU), a large plurality of mirror drivers, and at least one of a network and a user interface.

Description of Processes

Figure 4:
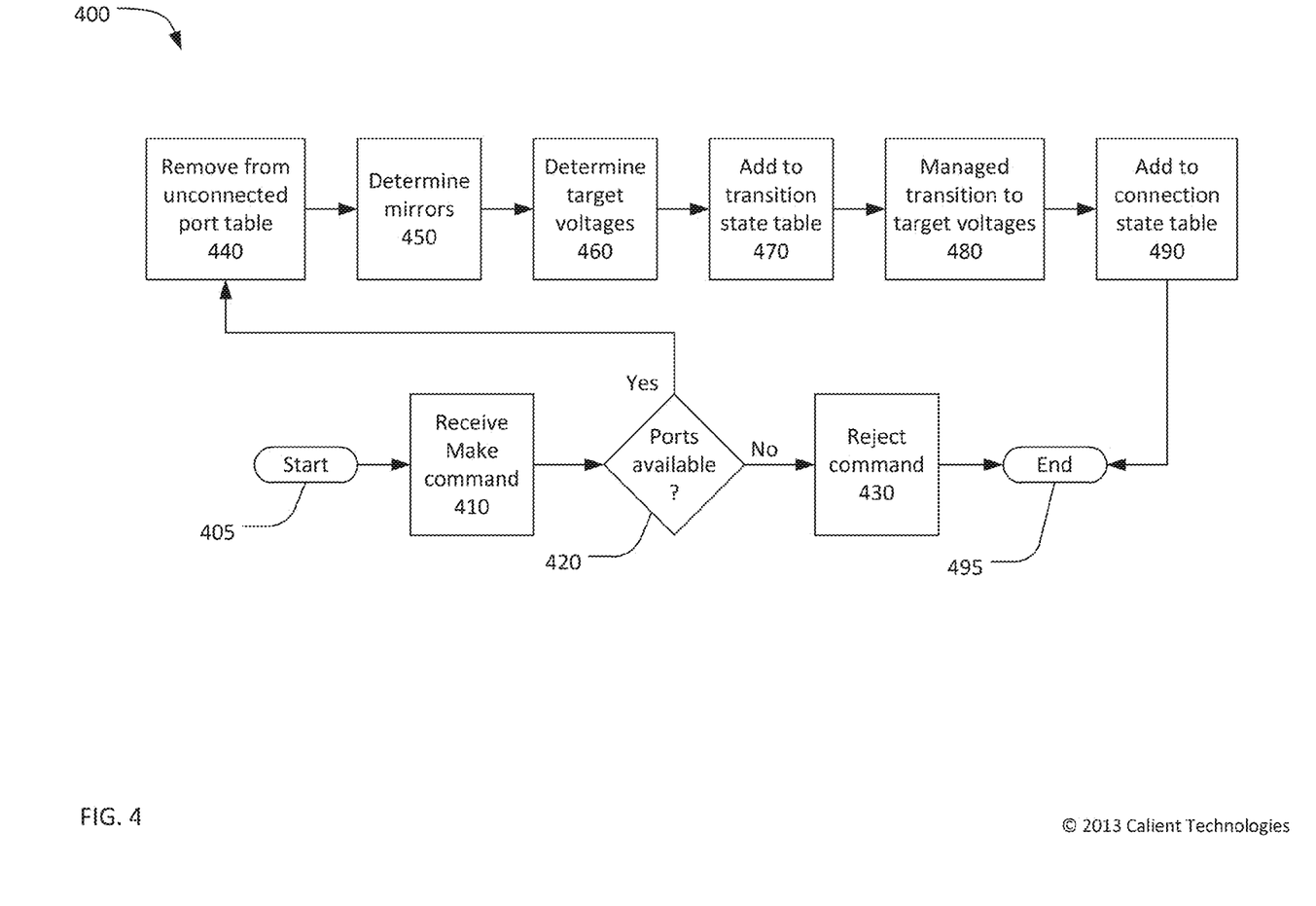
FIG. 4 is a flow chart of a process for executing a Make command.

Referring now to FIG. 4, a process 400 to make a connection through an optical circuit switch, such as the optical circuit switch 100, may start at 405 and end at 495. The process 400 may be repeated numerous times during the operation of an optical circuit switch to make a corresponding number of connections. The process 400 may be executed by a controller, such as the controller 210 or the controller 300.

At 410, a Make command may be received, for example, from a user interface or via a network. The Make command may identify a half-duplex (i.e. unidirectional) connection between an input port (i.e. one port selected form the group In 1 to In n in FIG. 1) and an output port (i.e. one port selected from the group Out 1 to Out n in FIG. 1). A connection between an input port and an output port. The Make command may identify a full-duplex (i.e. bidirectional) connection between ports j and k, where j and k are integers between 1 and n. A full-duplex Make command may be satisfied by making a first connection between port In j and Out k, and a second connection between ports In k, and Out j. In this case, the process 400 may be performed twice, either sequentially or concurrently, for the two connections.

At 420, a determination may be made if the input and output ports identified in the Make command are available. For example, a determination may be made whether or not both the input port and the output ports are listed in the unconnected port table 226. If one or both ports is not listed in the table of unconnected ports 226 ("no" at 420), the command may be rejected at 430, and the process 400 may end at 495. The command may be rejected at 430, for example, by displaying or sending a message indicating that one or both of the ports is not available.

When both the input port and output port identified in the Make command received at 410 are available ("yes" at 420), the ports may be removed from the unconnected port table 226 at 440. As previously described in conjunction with FIG. 1, the input port and the output port may each be associated with a specific movable mirror element in one of two mirrors arrays within the optical circuit switch. However, to allow the use of mirrors arrays with one or more nonfunctional mirror elements, the mapping of the ports to the mirror elements may be different between optical circuit switches. Thus each optical circuits switch may include a port map, such as the port map 222, to associate ports with mirror elements. At 450, the port map 222 may be consulted to identify the mirror elements associated with the input and output ports identified in the Make command received at 410.

As previously described, an optical circuit switch may include a mirror calibration table 224 which contains data describing the performance of each movable mirror element in the optical circuit switch. At 460, the mirror calibration table 224 may be consulted to determine target voltage values to be applied to electrodes associated with the mirror elements identified at 450.

At 470, data identifying the mirror elements identified at 450 and the target voltage values determined at 460 may be added to a transition state table, such as the transition state table 242. A transition manager, such as the transition manager 230, may then manage a progressive transition of the voltages applied to the electrodes associated with the mirror elements identified at 450. Once the applied voltages have been transitioned to the respective target voltage values, at 490 the mirror elements identified at 450 may be removed from the transition state table and added to a connection state table to indicate that the mirror elements are now used in a connection. The process 400 may then end at 495.

Figure 5:
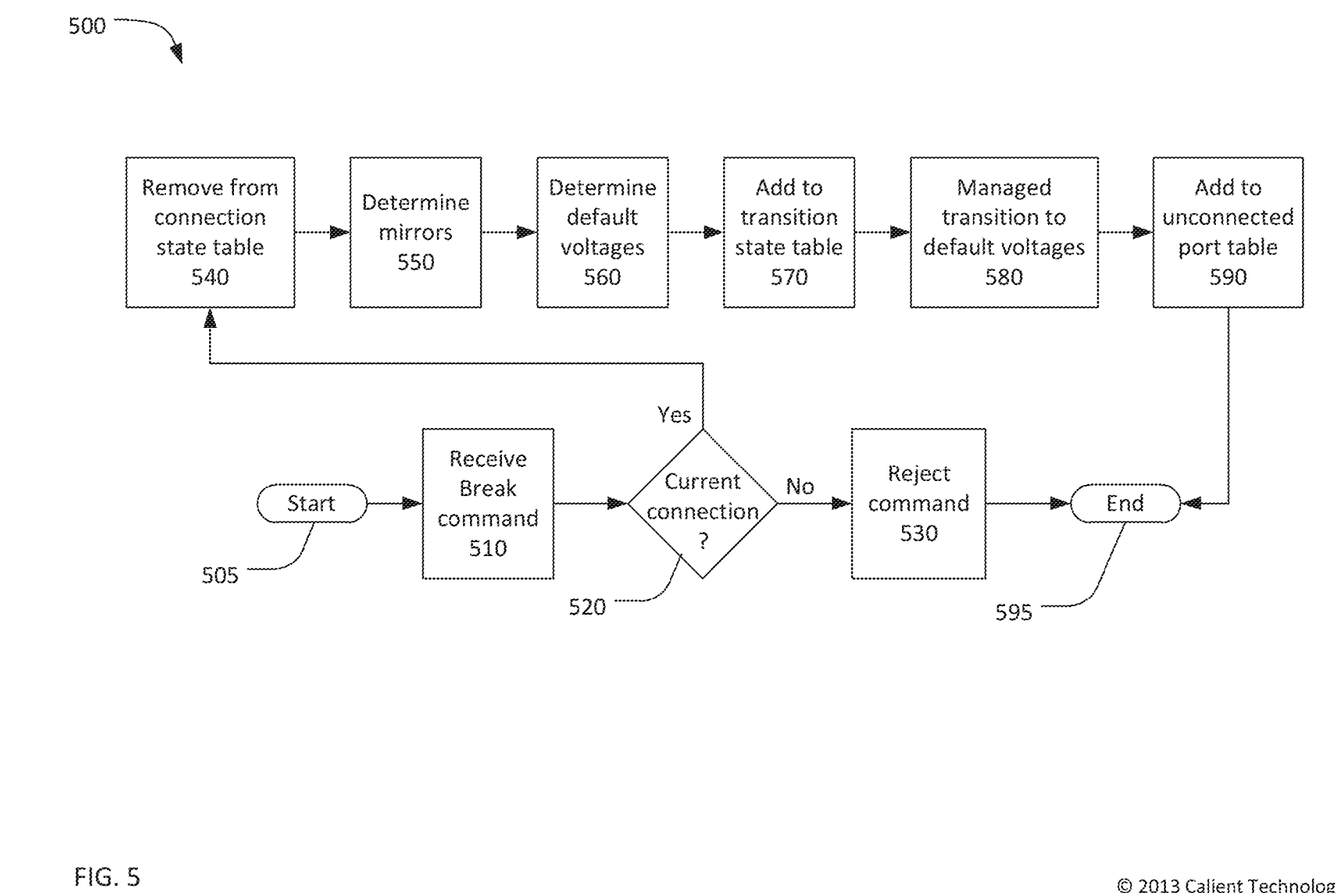
FIG. 5 is a flow chart of a process for executing a Break command.

Referring now to FIG. 5, a process 500 to break a connection through an optical circuit switch, such as the optical circuit switch 100, may start at 505 and end at 595. The process 500 may be repeated numerous times during the operation of an optical circuit switch to break a corresponding number of connections. The process 500 may be executed by a controller, such as the controller 210 or the controller 300.

At 510, a Break command may be received, for example, from a user interface or via a network. The Break command may identify a half duplex connection between an input port and an output port to be broken. The Break command may identify a full-duplex connection between a pair port number. When the Break command identifies a full-duplex connection, the process 500 may be performed twice, either sequentially or concurrently.

At 520, a determination may be made if the input and output ports identified in the Break command are, in fact, currently connected thru the optical circuit switch. For example, a determination may be made whether or not the connection identified in the Break command is listed in a connection state table 242. If the connection is not listed in the connection state table 226 ("no" at 520), the command may be rejected at 530, and the process 500 may end at 595. The command may be rejected at 530, for example, by displaying or sending a message indicating that the connection to be broken does not exist.

When the connection identified in the Break command is current, the connection may be removed from the connection state table 242 at 540. As previously described in conjunction with FIG. 1, the input port and the output port used in the connection may each be associated with a specific movable mirror element in one of two mirror elements arrays within the optical circuit switch. At 550, the port map 222 may be consulted to identify the mirror elements associated with the input and output ports identified in the Break command received at 510.

As previously described, an optical circuit switch may include a mirror calibration table 224 which contains data describing the performance of each movable mirror element in the optical circuit switch. At 560, the mirror calibration table 224 may be consulted to determine default voltage values to be applied to electrodes associated with the mirror elements identified at 550 to cause the mirror elements to move to a respective disconnected position.

At 570, data identifying the mirror elements identified at 550 and the default voltage values determined at 560 may be added to a transition state table, such as the transition state table 242. A transition manager, such as the transition manager 230, may then manage a progressive transition of the voltages applied to the electrodes associated with the mirror elements identified at 550. Once the applied voltages have been transitioned to the respective default voltage values, at 590 the mirror elements identified at 550 may be removed from the transition state table and added to the unconnected ports table 226 to indicate that the Ports are not used in a connection. The process 500 may then end at 595.

In some situations, the operator of a network or a data center may desire to make multiple new or changed connections through an optical circuit switch in a short period of time. Such situations may occur, for example, when a substantial system reconfiguration is needed to recover from a failure of some portion of the system. A substantial reconfiguration of an optical circuit switch may be accomplished by repeating the process 500 to break existing connections and repeating the process 400 to make new connections. However, repeated use of the processes 400 and 500 may consume more time that desired.

Figure 6:
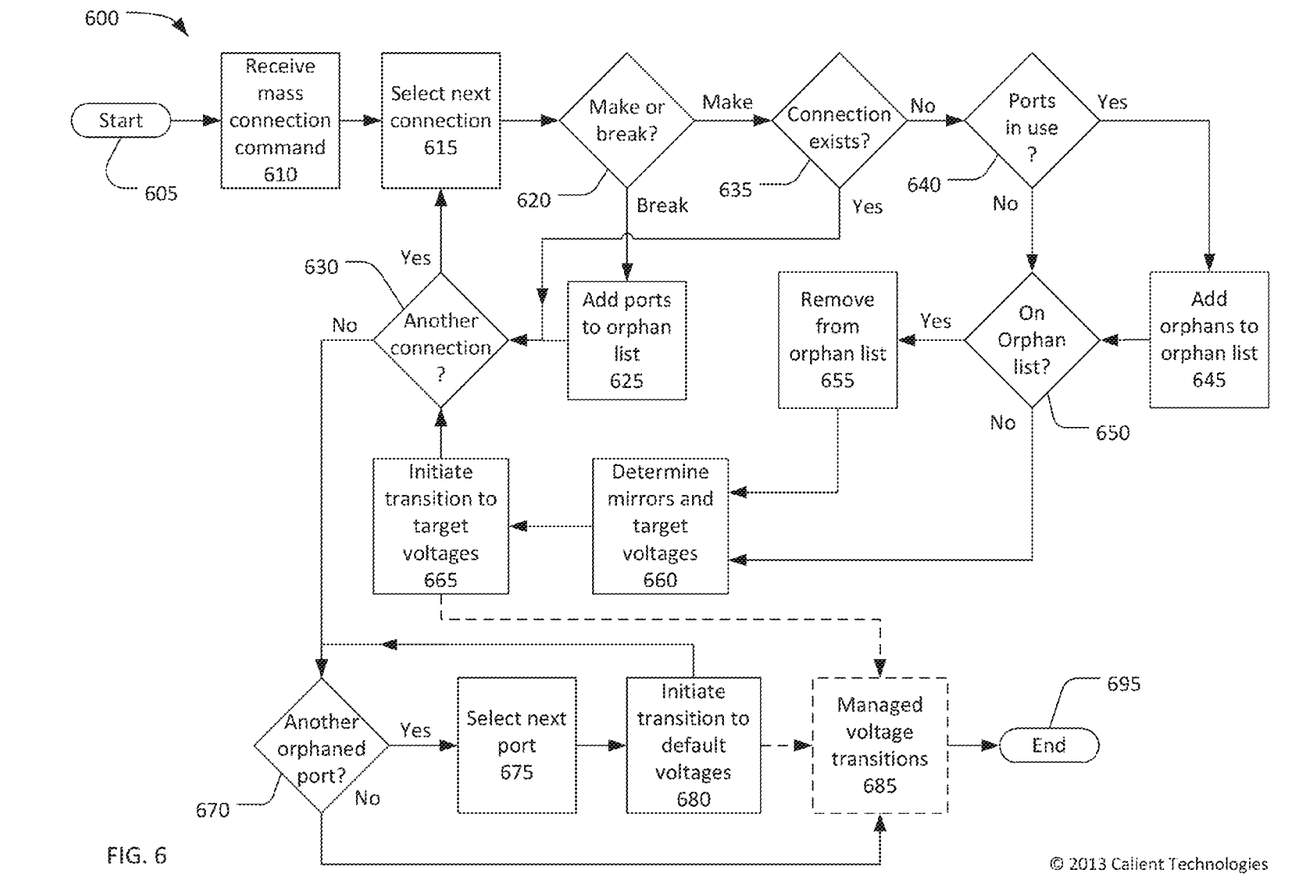
FIG. 6 is a flow chart of a process for executing a Mass Connection command.

FIG. 6 is a flow chart of a process 600 for making and/or breaking mass connections in an optical circuit switch, which is to say making or breaking a plurality of connections concurrently. The process 600 may start at 605 and may end at 695. The process 600 may be cyclic in nature. The actions from 615 to 630 may be repeated for each connection to be broken, the actions from 615 to 665 may be repeated for each connection to be made, and the actions from 670 to 680 may be repeated as necessary to return unused mirror elements to a default state.

At 610, a mass connection command may be received, for example from a user interface or via a network. The mass connection command may include a list of at least two connections through the optical circuit switch to be made or broken. The connections to be made or broken may be half-duplex connections or full-duplex connections. Each full-duplex connection may be considered as a pair of half-duplex connections during the process 600.

At 615, a first half-duplex connection (i.e. a first pair of ports including an input port and an output port) from the mass connection command may be selected. At 620, a determination may be made if the connection selected at 615 is to be made or broken. When the connection is to be broken ("Break" at 620), the two ports previously connected by the connection being broken may be added to an "orphan" list at 625. In this context, an "orphan" is a port that (at this point in the process 600) will be unused and needs to be returned to a default state. A port that is added to the orphan list at 625 may subsequently be removed from the orphan list and incorporated into a different connection. After the ports are added to the orphan list at 625, a determination may be made at 630 whether or not all of the connections identified in the mass connection command have been processed. If another connection needs to be processed, the process 600 may return to 615 to select the next connection.

The mass connection command received at 610 may list a plurality of connections that need to exist after execution of the mass connection command. Some of these connections may already exist prior to the receipt of the mass connection command. When a determination is made at 620 that the connection selected at 615 is to be made, a further determination may be made at 635 whether or not the connection already exists. The determination whether or not the connection selected at 615 already exists may be made by consulting a list of current connections such as the connection state table 242. For example, the mass connection command received at 610 may include making a connection between input port A and output port B (A and B being integers between 1 and n). If input port A and output port B are already connection to each other through the optical circuit switch, no further action is required. When the selected connection already exists, the process 600 may return to 630 to determine whether or not all of the connections identified in the mass connection command have been processed. If another connection needs to be processed, the process 600 may return to 615 to select the next connection.

When the connection selected at 615 does not already exist ("no" at 635), a further determination may be made at 640 whether or not one or both of the ports to be connected are in use (i.e. connected to some other port, but not to each other). When either or both of the ports are in use ("yes" at 640) the port or ports to which they are connected may be added to the orphan list at 645. Continuing the previous example, if a determination is made at 635 that input port A and output port B are not connected to each other, a determination may be made at 640 that input port A is presently connected to output port C and/or output port B is presently connector to input port D. In this case, output port C and input port D will be orphans after input port A is connected to output port B.

After orphaned ports have been added to the orphan list at 645, or in the case that neither of the ports were in use ("no" at 640), a determination may be made at 650 whether or not one or both of the ports to be connected are on the orphan list (as a result of a connection that was previously broken by the mass connection command). When either or both of the ports to be connected are on the orphan list ("yes" at 650), they may be removed from the orphan list at 655.

After the ports to be connected have been removed the orphan list at 655, or in the case that neither of the ports were on the orphan list ("no" at 650), the mirror elements associated with the pair of ports to be connected may be identified at 660, for example, by consulting the port map 222. Also at 660, target voltages to be applied to electrodes associated with the identified mirror elements may be determined, for example by consulting the mirror calibration table 224.

At 665, the mirror elements and target voltages identified at 630 may be added to the transition state table 232 associated with transition manager 230. Adding the mirror elements and target voltages to the transition state table at 665 may initiate a managed transition from the existing voltages on the mirror electrodes to the target voltages at 685, as indicated by the dashed line. Once initiated, the managed voltage transition at 685 may occur concurrently with, and independently of, other actions within the process 600.

After the mirror elements and target voltages have been added to the transition state table at 665, the process 600 may return to 630 to determine whether or not there is another connection identified in the mass connection command to process. When another connection requires processing ("yes" at 615), the actions from 615 to 665 may be repeated for the next connection. The actions from 615 to 665 may be repeated for each connection to be made or broken by the mass connection command.

When no additional connections require processing ("no" at 630) the process 600 may proceed to 670 to determine whether or not there is at least one orphaned port on the orphan list. When there is one or more disconnected ports, a specific orphaned port may be selected at 675, the mirror element associated with that port may be identified, and default voltage values for that mirror element may be determined. For example, the mirror element may be identified by consulting the port map 222. The default voltage values may be, for example, zero volts, to allow the mirror element to return to its natural position. The default voltage values may be values other than zero, as defined in the mirror calibration table 224.

At 680, the mirror element and default voltage values identified at 675 may be added to the transition state table 232 associated with transition manager 230. Adding the mirror element and default voltages to the transition state table at 650 may initiate a managed transition from the existing voltages on the mirror electrodes to the default voltages at 655, as indicated by the dashed line. Once initiated, the managed voltage transition at 655 may occur concurrently with, and independently of, other actions within the process 600.

After the mirror element and default voltages have been added to the transition state table at 650, the process 600 may return to 640 to determine whether or not there is another orphaned port to process. When another orphaned port requires processing ("yes" at 640), the actions from 670 to 680 may be repeated for the next orphaned port. The actions from 670 to 680 may be repeated for each orphaned port resulting from the mass connection command.

When there are no additional disconnected ports to process ("no" at 670), managed voltage transitions may continue at 685 until the electrodes associated with all mirror elements affected by the mass connection command have reached the respective target or default voltage values. Once all of the managed voltage transitions have been completed, the process 600 may end at 695.

Figure 7:
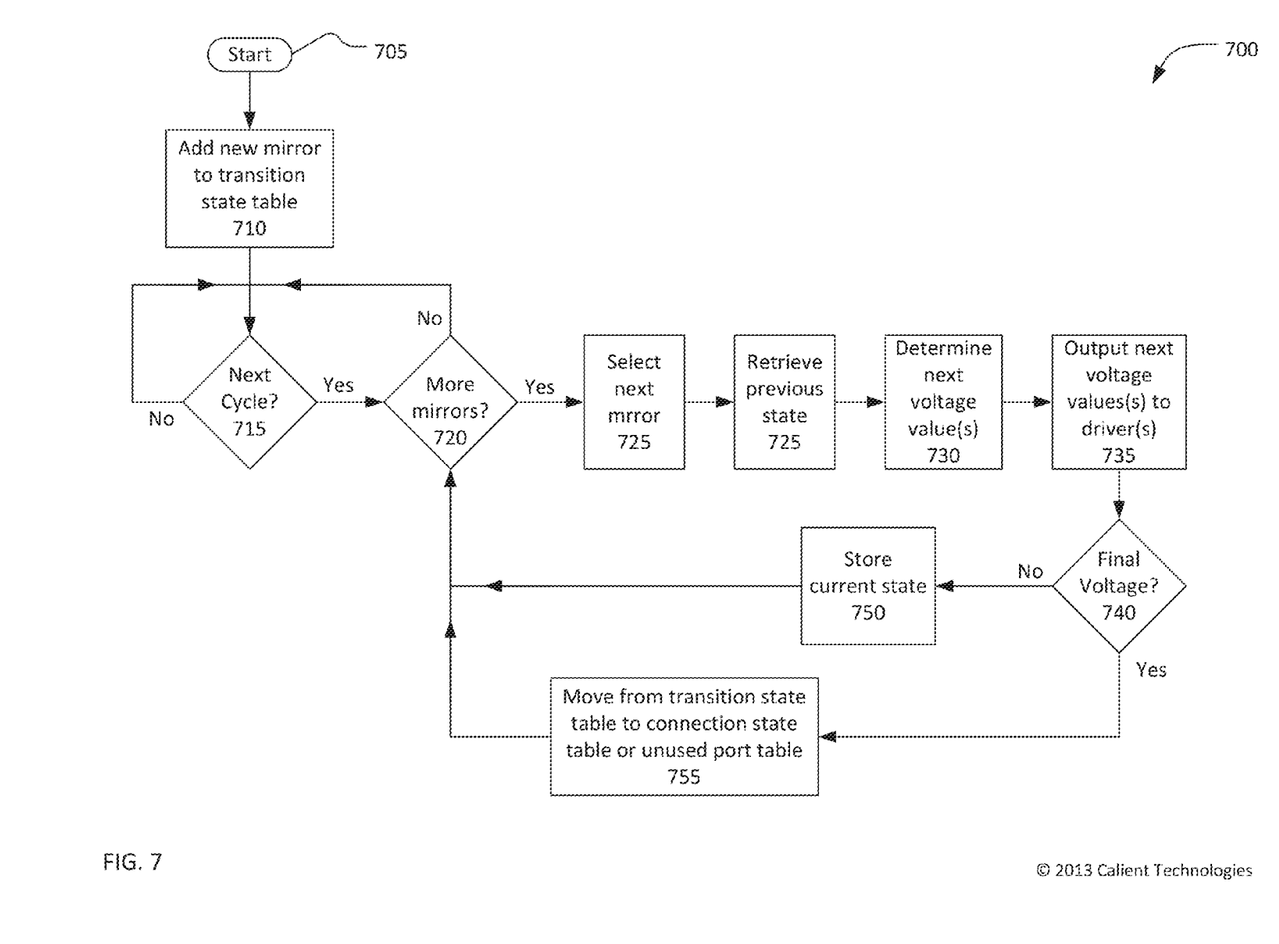
FIG. 7 is a functional diagram of a transition manager.

FIG. 7 is a functional diagram of a transition manager 700 which may be suitable for use as the transition manager 230 in the optical circuit switch 200 and for performing managed voltage transitions at 480 in the process 400, 580 in the process 500, and 655 in the process 600. The functional diagram is presented as a flow chart for ease of explanation. The transition manager 700 may be implemented by software executed on a processor, in which case the actions shown in the flow chart may be performed consecutively. The transition manager 700 may be implemented in hardware, such as a state machine implemented in a field programmable gate array or application specific integrated circuit, in which case multiple actions shown in the flow chart may be performed essentially simultaneously. The transition manager 700 may be implemented by a combination of hardware and software. In any case, the transition manager 700 may be cyclic in nature, with the actions from 715 to 760 repeated multiple times at regular time intervals, and the actions from 720 to 760 repeated for each controlled mirror element during each time interval.

The transition manager 700 may be configured to concurrently control or manage iterative voltage transitions on any number of electrodes associated with any number of mirror elements, from a single mirror element to hundreds of mirror elements if required by a mass connection command. An "iterative voltage transition" is a transition in which repetition of a sequence of operations generates a voltage value that is successively closer to a desired or target value. In this context, "concurrently" means "within the same time period". The voltage transitions on two mirror elements are considered to be concurrent if the time periods in which the transitions occur overlap to some extent.

The actions performed by the transition manager 700 may start at 705 when a required change in the angle of a mirror element is defined. The angle change may be required, for example, to break an existing optical circuit connection or to make a new connection. The required angle change may be defined in terms of a target voltage to be applied to an electrode associated with the mirror element. The actions performed by the transition manager 700 may continue perpetually.

At 710, the mirror element to be changed may be added to a transition state table. The transition state table may identity all mirror elements presently under control of the transition manager 700. When the optical circuit switch has received a single make or break command and is executing the process 400 or 500, there may be only two mirror elements listed in the transition state table. When the optical circuit switch has received a mass connection command, there may be dozens or hundreds of mirror elements listed in the transition state table.

The transition state table may include, or be linked to, information representing the state of each mirror element controlled by the transition manager 700. This information may include an initial voltage value (i.e. the voltage that was applied to the electrode prior to the transition), a target voltage value (which may be expressed as a change to the initial voltage value), and a step count indicating how far the transition from the initial voltage value to the target voltage value has progressed. When the mirror elements in an optical circuit switch are movable on two axes, the state table may including initial voltage values and target voltages values for each of the two axes. When a new mirror element is added to the transition state table at 710, the step count may be initialized at zero. A new mirror element may be added to the transition state table at any time during the operation of the transition manager 700.

In some circumstances, such as a receipt of a second command that affects mirror elements that are already in the transition state table as a consequence of a prior command, mirror elements may be removed from the transition state table before the transition manage 700 has completed the transition. In this situation, the mirror elements removed from the transition state table may subsequently be reentered into the transition state table with different target voltage values.

As previously described, the transition manager 700 may be cyclic in nature and may update the voltage applied to each controlled mirror element at periodic time intervals. At 715, a determination may be made if the time for the next cycle has arrived. The time to start the next cycle may be determined, for example, from a real time clock, by a signal from a count-down timer, or in some other manner. When the time for the next cycle has not yet arrived ("no" at 715), the transition manager 700 may idle at 715 until the start of the next cycle.

When the time for the next cycle has arrived ("yes" at 715), a determination may be made at 720 if there is a another mirror element that needs to be controlled during the cycle, which is to say that there is at least one mirror element listed in the transition state table that has not been processed during this time cycle. When a determination is made that all mirror elements have been processed during the current time cycle, the transition manager may return to 715 and idle until the start of the next cycle.

When a determination is made that there is another mirror element to be controlled ("yes" at 720), the previous state of the mirror element may be retrieved from the transition state table at 725. The "previous state" is the state information stored during the previous cycle (or the initial state information stored at 710 for a mirror element newly added to the transitions state table). A next voltage value to be applied to an electrode associated with the mirror element may be determined at 730. The next voltage value may be determined at 730 based on the state information retrieved at 725. For example, the next voltage value may be a linear function of the state information, as shown in the formula:

$$Vn = Vi \pm n(\Delta V) \quad (1)$$

where:
Vn=a voltage value at step n;
Vi=the initial voltage value;
ΔV=a predetermined voltage increment.

In this case, the duration of the transition (i.e. the number of steps) and the sign used in equation (1) depend on the relative values of the initial voltage value and the target voltage value, and the process is ended when the next voltage value would overshoot the target voltage value.

For further example, the next voltage value may be a linear function of the state information, as shown in the formula:

$$Vn = Vi + n(Vt - Vi)/N \quad (2)$$

where:
Vt=the target voltage value;
N=a predetermined number of steps during the transition; and
Vn and Vi were previously defined.

In this case, the duration (number of steps) of the transition is predetermined.

The attractive force between a mirror element and an associated electrode may be roughly proportional to the square of the applied voltage. To provide a linear, or nearly linear, transition of the attractive force, the next voltage value may be determined from the formula:

$$Vn^2 = Vi^2 + n(Vt^2 - Vi^2)/N \quad (3)$$

where:
Vn, Vi, Vt, n, and N were previously defined.

A nonlinear voltage transition may be used. For example, the next voltage may be determined by one of the following formulas:

$$Vn = Vi + k(n)(Vt - Vi), \text{ or} \quad (4)$$

$$Vn^2 = Vi^2 + k(n)(Vt^2 - Vi^2) \quad (5)$$

where:
k(n)=a constant between 0 and 1, retrieved from a lookup table containing N constants k(1) to k(N); and
Vn, Vi, Vt, n, and N were previously defined.

The next voltage value may be determined at 730 in some other manner, such as a polynomial function, an exponential function, a logarithmic function, or another nonlinear function of the state information. When the mirror elements in an optical circuit switch are movable on two axes, two voltage values (i.e. a voltage for each axis) may be determined at 730. In any case, at 735, the next voltage value or values determined at 730 may be output to mirror driver circuits associated with the mirror element selected at 720. For example, the next voltage values may be output to the mirror driver circuits over a digital bus such as the digital data bus 212.

At 740, a determination may be made whether or not the final step for the mirror element selected at 720 has been reached. When the number of steps in a transition is predetermined, a determination may be made at 740 whether or not the predetermined number of steps have been completed. When the number of steps is not predetermined, a determination may be made at 740 whether or not the last voltage value or values output to the mirror drivers was equal to or very close to the target voltage value or values. When the last step has not been taken ("no" at 740), the step number may be incremented at 745 and the mirror element state, including the incremented step number and optionally the voltage values from 730, may be stored at 750. When the last step has been taken ("yes" at 740), the mirror element may be removed from the transition state table and may be added to the connection state table at 755.

The transition manager 700 may then continue at 720 to make a determination whether or not the transition state table lists at least one other mirror element to be processed during the present cycle of the transition manager 700. When there is another mirror element to be processed ("yes" at 720), the transition manager 700 may repeat from 720. The actions from 720 to 760 may be repeated until all of the mirror elements listed in the transition state table have been processed. When no mirror elements remain to be processed, the transition manager 700 may return to 715 to await the start of the next cycle.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An optical circuit switch, comprising:
a plurality of mirror elements, each mirror element coupled to a dedicated electrode, each mirror element configured to rotate in response to a voltage applied to the dedicated electrode;
a plurality of ports, each port uniquely associated with a corresponding mirror element from the plurality of mirror elements;
a command interpreter configured to:
  receive a mass connection command defining a plurality of port-pairs to be connected via the optical circuit switch, each port-pair consisting of two ports from the plurality of ports,
  determine respective target voltage values to be applied to the dedicated electrodes coupled to the mirror elements associated with the port-pairs defined in the mass connection command;
  identify one or more ports disconnected as a consequence of the mass connection command, and
  determine respective default voltage values to be applied to the dedicated electrodes coupled to the mirror elements associated with the one or more disconnected ports; and
a transition manager configured to:
  cause voltages applied to the dedicated electrodes coupled to the mirror elements associated with the port-pairs defined in the mass connection command to concurrently transition from respective previous voltage values to the respective target voltage values, and
  cause voltages applied to the dedicated electrodes coupled to mirror elements associated with the one or more disconnected ports to concurrently transition from respective initial voltage values to the respective default voltage values.

2. An optical circuit switch, comprising:
a plurality of mirror elements, each mirror element coupled to a dedicated electrode, each mirror element configured to rotate in response to a voltage applied to the dedicated electrode;
a plurality of ports, each port uniquely associated with a corresponding mirror element from the plurality of mirror elements;
a command interpreter configured to:
  receive a mass connection command defining a plurality of port-pairs to be connected via the optical circuit switch, each port-pair consisting of two ports from the plurality of ports, and
  determine respective target voltage values to be applied to the dedicated electrodes coupled to the mirror elements associated with the port-pairs defined in the mass connection command; and
a transition manager configured to cause voltages applied to the dedicated electrodes coupled to the mirror elements associated with the port-pairs defined in the mass connection command to concurrently transition from respective previous voltage values to the respective target voltage values, wherein the transition manager comprises a state machine configured to:
  retrieve, from a memory, previous state information for the dedicated electrodes coupled to the mirror elements associated with the port-pairs defined in the mass connection command;
  determine respective current voltages to be applied to the dedicated electrodes coupled to the mirror elements associated with the port-pairs defined in the mass connection command based on the respective state information; and
  store, in the memory, current state information for the dedicated electrodes coupled to the mirror elements associated with the port-pairs defined in the mass connection command,
  the state information for each dedicated electrode including the respective initial voltage value, the respective target voltage value, and a respective step count that is incremented prior to storing the current state information.

3. The optical circuit switch of claim 2, wherein the voltage to be applied to each dedicated electrode coupled to mirror elements associated with the port-pairs defined in the mass connection command is determined using the formula:

$$Vn = Vi + n(Vt - Vi)/N$$

where:
  n = the respective step count
  Vn = a respective voltage value at step n;
  Vi = the respective initial voltage value;
  Vt = the respective target voltage value; and
  N = a predetermined number of steps during the transition.

4. The optical circuit switch of claim 2, wherein the voltage to be applied to each dedicated electrode coupled to mirror elements associated with the port-pairs defined in the mass connection command is determined using the formula:

$$Vn^2 = Vi^2 + n(Vt^2 - Vi^2)/N$$

where:
  n = the respective step count
  Vn = a respective voltage value at step n;
  Vi = the respective initial voltage value;
  Vt = the respective target voltage value; and
  N = a predetermined number of steps during the transition.

5. The optical circuit switch of claim 2, wherein the voltage to be applied to each dedicated electrode coupled to mirror elements associated with the port-pairs defined in the mass connection command is determined using the formula:

$$Vn = Vi + k(n)(Vt - Vi)$$

where:
  n = the respective step count
  Vn = a respective voltage value at step n;
  Vi = the respective initial voltage value;
  Vt = the respective target voltage value;
  k(n) = a constant retrieved from a lookup table having a value between 0 and 1, the lookup table storing K constants k(1) to k(N); and
  N = a predetermined number of steps during the transition.

6. The optical circuit switch of claim 2, wherein the voltage to be applied to each dedicated electrode coupled to mirror elements associated with the port-pairs defined in the mass connection command is determined using the formula:

$$Vn^2 = Vi^2 + k(n)(Vt^2 - Vi^2)$$

where:
  n = the respective step count
  Vn = a respective voltage value at step n;
  Vi = the respective initial voltage value;
  Vt = the respective target voltage value;
  k(n) = a constant retrieved from a lookup table having a value between 0 and 1, the lookup table storing K constants k(1) to k(N); and N=a predetermined number of steps during the transition.

7. The optical circuit switch of claim 2, wherein the voltage to be applied to each dedicated electrode coupled to mirror elements associated with the port-pairs defined in the mass connection command is determined as a nonlinear function of the respective state information.

8. A method for controlling an optical circuit switch, comprising:
receiving a mass connection command defining a plurality of port-pairs to be connected via the optical circuit switch, each port-pair consisting of two ports from a plurality of ports, each of the plurality of ports unique associated with a corresponding mirror element from a plurality of mirror elements, each mirror element coupled to a respective dedicated electrode and configured to rotate in response to a voltage applied to the respective dedicated electrode;
determining respective target voltage values to be applied to the dedicated electrodes coupled to mirror elements associated with the port-pairs defined in the mass connection command;
causing voltages applied to the dedicated electrodes coupled to the mirror elements associated with the port-pairs defined in the mass connection command to concurrently transition from respective previous voltage values to the respective target voltage values;
identifying one or more ports disconnected as a consequence of the mass connection command;
determining respective default voltage values to be applied to the dedicated electrodes coupled to the mirror elements associated with the one or more disconnected ports; and
causing voltages applied to the dedicated electrodes coupled to the mirror elements associated with the one or more disconnected ports to concurrently transition from respective previous voltage values to the respective default voltage values.

9. A method for controlling an optical circuit switch, comprising:
receiving a mass connection command defining a plurality of port-pairs to be connected via the optical circuit switch, each port-pair consisting of two ports from a plurality of ports, each of the plurality of ports unique associated with a corresponding mirror element from a plurality of mirror elements, each mirror element coupled to a respective dedicated electrode and configured to rotate in response to a voltage applied to the respective dedicated electrode;
retrieving, from a memory, respective previous state information for the dedicated electrodes coupled to mirror elements associated with the port-pairs defined in the mass connection command;
determining respective voltages to be applied to the dedicated electrodes coupled to mirror elements associated with the port-pairs defined in the mass connection command based on the respective state information;
causing voltages applied to the dedicated electrodes coupled to the mirror elements associated with the port-pairs defined in the mass connection command to concurrently transition from respective previous voltage values to the respective target voltage values; and
storing, in the memory, current state information for the dedicated electrodes coupled to mirror elements associated with the port-pairs defined in the mass connection command,
wherein the state information for each dedicated electrode includes the respective initial voltage value, the respective target voltage value, and a respective step count that is incremented prior to storing the current state information.

10. The method for controlling an optical circuit switch of claim 9, wherein determining a respective voltage to be applied to each dedicated electrode coupled to mirror elements associated with the port-pairs defined in the mass connection command uses the formula:

$$Vn=Vi+n(Vt-Vi)/N$$

where:
n=the respective step count
Vn=a respective voltage value at step n;
Vi=the respective initial voltage value;
Vt=the respective target voltage value; and
N=a predetermined number of steps during the transition.

11. The method for controlling an optical circuit switch of claim 9, wherein determining a respective voltage to be applied to each dedicated electrode coupled to mirror elements associated with the port-pairs defined in the mass connection command uses the formula:

$$Vn^2=Vi^2+n(Vt^2-Vi^2)/N$$

where:
n=the respective step count
Vn=a respective voltage value at step n;
Vi=the respective initial voltage value;
Vt=the respective target voltage value; and
N=a predetermined number of steps during the transition.

12. The method for controlling an optical circuit switch of claim 9, wherein determining a respective voltage to be applied to each dedicated electrode coupled to mirror elements associated with the port-pairs defined in the mass connection command uses the formula:

$$Vn=Vi+k(n)(Vt-Vi)$$

where:
n=the respective step count
Vn=a respective voltage value at step n;
Vi=the respective initial voltage value;
Vt=the respective target voltage value;
k(n)=a constant retrieved from a lookup table having a value between 0 and 1, the lookup table storing K constants k(1) to k(N); and
N=a predetermined number of steps during the transition.

13. The method for controlling an optical circuit switch of claim 9, wherein determining a respective voltage to be applied to each dedicated electrode coupled to mirror elements associated with the port-pairs defined in the mass connection command uses the formula:

$$Vn^2=Vi^2+k(n)(Vt^2-Vi^2)$$

where:
n=the respective step count
Vn=a respective voltage value at step n;
Vi=the respective initial voltage value;
Vt=the respective target voltage value;
k(n)=a constant retrieved from a lookup table having a value between 0 and 1, the lookup table storing K constants k(1) to k(N); and
N=a predetermined number of steps during the transition.

14. The method for controlling an optical circuit switch of claim 9, wherein determining a respective voltage to be applied to each dedicated electrode coupled to mirror elements associated with the port-pairs defined in the mass connection comprises determining each voltage as a non-linear function of the respective state information.

15. Apparatus comprising a storage medium storing an optical circuit switch control program including instructions which, when executed by a processor, will cause the processor to perform actions comprising:
receiving a mass connection command defining a plurality of port-pairs to be connected via the optical circuit switch, each port-pair consisting of two ports from a plurality of ports, each of the plurality of ports unique associated with a corresponding mirror element from a plurality of mirror elements, each mirror element coupled to a respective dedicated electrode and configured to rotate in response to a voltage applied to the respective dedicated electrode;
determining respective target voltage values to be applied to the dedicated electrodes coupled to mirror elements associated with the port-pairs defined in the mass connection command;
causing voltages applied to the dedicated electrodes coupled to the mirror elements associated with the port-pairs defined in the mass connection command to concurrently transition from respective previous voltage values to the respective target voltage values;
identifying one or more ports disconnected as a consequence of the mass connection command;
determining respective default voltage values to be applied to the dedicated electrodes coupled to the mirror elements associated with the one or more disconnected ports; and
causing voltages applied to the dedicated electrodes coupled to the mirror elements associated with the one or more disconnected ports to concurrently transition from respective previous voltage values to the respective default voltage values.

16. The apparatus of claim 15 further comprising:
a processor; and
a memory,
wherein the processor and the memory comprise circuits and software for performing the instructions stored on the storage medium.

17. An apparatus comprising a storage medium storing an optical circuit switch control program including instructions which, when executed by a processor, will cause the processor to perform actions, comprising:
receiving a mass connection command defining a plurality of port-pairs to be connected via the optical circuit switch, each port-pair consisting of two ports from a plurality of ports, each of the plurality of ports unique associated with a corresponding mirror element from a plurality of mirror elements, each mirror element coupled to a respective dedicated electrode and configured to rotate in response to a voltage applied to the respective dedicated electrode;
retrieving, from a memory, respective previous state information for the dedicated electrodes coupled to mirror elements associated with the port-pairs defined in the mass connection command;
determining respective voltages to be applied to the dedicated electrodes coupled to mirror elements associated with the port-pairs defined in the mass connection command based on the respective state information;
causing voltages applied to the dedicated electrodes coupled to the mirror elements associated with the port-pairs defined in the mass connection command to concurrently transition from respective previous voltage values to the respective target voltage values; and
storing, in the memory, current state information for the dedicated electrodes coupled to mirror elements associated with the port-pairs defined in the mass connection command,
wherein the state information for each dedicated electrode includes the respective initial voltage value, the respective target voltage value, and a respective step count that is incremented prior to storing the current state information.

18. The apparatus of claim 17, wherein determining a respective voltage to be applied to each dedicated electrode coupled to mirror elements associated with the port-pairs defined in the mass connection command uses the formula:

$$Vn = Vi + n(Vt - Vi)/N$$

where:
n = the respective step count
Vn = a respective voltage value at step n;
Vi = the respective initial voltage value;
Vt = the respective target voltage value; and
N = a predetermined number of steps during the transition.

19. The apparatus of claim 17, wherein determining a respective voltage to be applied to each dedicated electrode coupled to mirror elements associated with the port-pairs defined in the mass connection command uses the formula:

$$Vn^2 = Vi^2 + n(Vt^2 - Vi^2)/N$$

where:
n = the respective step count
Vn = a respective voltage value at step n;
Vi = the respective initial voltage value;
Vt = the respective target voltage value; and
N = a predetermined number of steps during the transition.

20. The apparatus of claim 17, wherein determining a respective voltage to be applied to each dedicated electrode coupled to mirror elements associated with the port-pairs defined in the mass connection command uses the formula:

$$Vn = Vi + k(n)(Vt - Vi)$$

where:
n = the respective step count
Vn = a respective voltage value at step n;
Vi = the respective initial voltage value;
Vt = the respective target voltage value;
k(n) = a constant retrieved from a lookup table having a value between 0 and 1, the lookup table storing K constants k(1) to k(N); and
N = a predetermined number of steps during the transition.

21. The apparatus of claim 17, wherein determining a respective voltage to be applied to each dedicated electrode coupled to mirror elements associated with the port-pairs defined in the mass connection command uses the formula:

$$Vn^2 = Vi^2 + k(n)(Vt^2 - Vi^2)$$

where:
n = the respective step count
Vn = a respective voltage value at step n;
Vi = the respective initial voltage value;
Vt = the respective target voltage value;

k(n)=a constant retrieved from a lookup table having a value between 0 and 1, the lookup table storing K constants k(1) to k(N); and N=a predetermined number of steps during the transition.

22. The apparatus of claim 17, wherein determining a respective voltage to be applied to each dedicated electrode coupled to mirror elements associated with the port-pairs defined in the mass connection comprises determining each voltage as a nonlinear function of the respective state information.

23. The apparatus of claim 17 further comprising:

a processor; and a memory, wherein the processor and the memory comprise circuits and software for performing the instructions stored on the storage medium.

* * * * *